(12) United States Patent
Won et al.

(10) Patent No.: US 11,617,147 B2
(45) Date of Patent: Mar. 28, 2023

(54) METHODS AND APPARATUSES FOR EFFICIENT REGISTRATION IN AN AREA WHERE A SERVICE IS SUPPORTED PARTIALLY

(71) Applicant: NOKIA TECHNOLOGIES OY, Espoo (FI)

(72) Inventors: Sung Hwan Won, Flower Mound, TX (US); Alessio Casati, Surrey (GB); Navin Hathiramani, Coppell, TX (US); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/307,675

(22) Filed: May 4, 2021

(65) Prior Publication Data

US 2022/0361135 A1    Nov. 10, 2022

(51) Int. Cl.
*H04W 60/04* (2009.01)
*H04W 76/11* (2018.01)
(Continued)

(52) U.S. Cl.
CPC ........... *H04W 60/04* (2013.01); *H04W 48/16* (2013.01); *H04W 48/18* (2013.01); *H04W 76/11* (2018.02)

(58) Field of Classification Search
CPC ..... H04W 60/04; H04W 48/16; H04W 48/18; H04W 76/11
See application file for complete search history.

(56) References Cited

U.S. PATENT DOCUMENTS 10,764,951 B2    9/2020 Park et al.
2020/0205065 A1  6/2020 Wei et al.
(Continued)

FOREIGN PATENT DOCUMENTS

WO    2021060383 A1    1/2021

OTHER PUBLICATIONS

"3rd Generation Partnership Project; Technical Specification Group Core Network and Terminals; Non-Access-Stratum (NAS) protocol for 5G System (5GS); Stage 3; (Release 17)", 3GPP TS 24.501, V17.1.0, Dec. 2020.

(Continued)

*Primary Examiner* — Diane D Mizrahi
(74) *Attorney, Agent, or Firm* — Squire Patton Boggs (US) LLP (57) ABSTRACT

Systems, methods, apparatuses, and computer program products for efficient registration for partially supported service areas are provided. One method may include providing, to at least one user equipment registered to a network within a registration area, information comprising one or more lists of single network slice selection assistance information (S-NSSAIs) and one or more lists of tracking area identities (TAIs). The one or more single network slice selection assistance information (S-NSSAIs) is included in a list of rejected single network slice selection assistance information (S-NSSAIs) or in a list of extended rejected single network slice selection assistance information (S-NSSAIs), and is associated with a cause value indicating that the one or more single network slice selection assistance information (S-NSSAIs) is not supported uniformly in the registration area and is not supported in a current tracking area.

13 Claims, 5 Drawing Sheets

(51) Int. Cl.
*H04W 48/16* (2009.01)
*H04W 48/18* (2009.01)

(56) References Cited

U.S. PATENT DOCUMENTS

| | | |
|---|---|---|
| 2020/0229079 A1 | 7/2020 | Lee et al. |
| 2021/0099945 A1 | 4/2021 | Watfa et al. |
| 2021/0250890 A1* | 8/2021 | Won ..................... H04W 76/11 |

OTHER PUBLICATIONS

Huawei, HiSilicon, "Correction on determination of Registration Area", 3GPP TSG-WG SA2 Meeting #143E e-meeting, 23.501, S2-2100119, Feb. 24, 2021.

Huawei, HiSilicon, "Discussion on determination of Registration Area", 3GPP TSG-WG SA2 Meeting #143E e-meeting, S2-2100118, Feb. 24, 2021.

"SOR check during mobility Registration", 3GPP TSG-WG SA2 Meeting #143E e-meeting, S2-2100452, 23.502, 16.7.1, Feb. 24, 2021.

* cited by examiner

Fig. 1

Area X

Fig. 2

Area X

Fig. 3A

Area X

Fig. 3B

Area X

METHODS AND APPARATUSES FOR EFFICIENT REGISTRATION IN AN AREA WHERE A SERVICE IS SUPPORTED PARTIALLY

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for efficient registration in an area where a service is supported partially.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to a method that may include providing, to at least one user equipment registered to a network within a registration area, information comprising one or more lists of single network slice selection assistance information (S-NSSAIs) and one or more lists of tracking area identities (TAIs). Each of the one or more single network slice selection assistance information (S-NSSAIs) may be included in a list of rejected single network slice selection assistance information (S-NSSAIs) or in a list of extended rejected single network slice selection assistance information (S-NSSAIs), and may be associated with a cause value indicating that the one or more single network slice selection assistance information (S-NSSAIs) is not supported uniformly in the registration area and is not supported in a current tracking area.

An embodiment may be directed to an apparatus, which may include at least one processor and at least one memory comprising computer program code. The at least one memory and computer program code are configured, with the at least one processor, to cause the apparatus at least to provide, to at least one user equipment registered to a network within a registration area, information comprising one or more lists of single network slice selection assistance information (S-NSSAIs) and one or more lists of tracking area identities (TAIs). Each of the one or more single network slice selection assistance information (S-NSSAIs) may be included in a list of rejected single network slice selection assistance information (S-NSSAIs) or in a list of extended rejected single network slice selection assistance information (S-NSSAIs), and may be associated with a cause value indicating that the one or more single network slice selection assistance information (S-NSSAIs) is not supported uniformly in the registration area and is not supported in a current tracking area.

An embodiment may be directed to a method that may include receiving, from a network (e.g., from an access and mobility management function) at a user equipment registered to the network within a registration area, information comprising one or more lists of single network slice selection assistance information (S-NSSAIs) and one or more lists of tracking area identities (TAIs). Each of the one or more single network slice selection assistance information (S-NSSAIs) may be included in a list of rejected single network slice selection assistance information (S-NSSAIs) or in a list of extended rejected single network slice selection assistance information (S-NSSAIs), and may be associated with a cause value indicating that the one or more single network slice selection assistance information (S-NSSAIs) is not supported uniformly in the registration area and is not supported in a current tracking area.

An embodiment may be directed to an apparatus, which may include at least one processor and at least one memory comprising computer program code. The at least one memory and computer program code are configured, with the at least one processor, to cause the apparatus at least to receive, from a network, information comprising one or more lists of single network slice selection assistance information (S-NSSAIs) and one or more lists of tracking area identities (TAIs), where the apparatus is registered to the network within a registration area. Each of the one or more single network slice selection assistance information (S-NSSAIs) may be included in a list of rejected single network slice selection assistance information (S-NSSAIs) or in a list of extended rejected single network slice selection assistance information (S-NSSAIs), and may be associated with a cause value indicating that the one or more single network slice selection assistance information (S-NSSAIs) is not supported uniformly in the registration area and is not supported in a current tracking area.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for efficient registration for partially supported service areas, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

It may be desirable to have an area, which can be referred to as area X with a tracking area identity (TAI) J, that is smaller than an existing tracking area and that supports a specific single network slice selection assistance information (S-NSSAI), which can be referred to as S-NSSAI m, depending on frequency/band allocation and availability. It is noted that a network slice may refer to a logical network that provides specific network capabilities and network characteristics, and a S-NSSAI may be used to uniquely identify a network slice.

Since tracking area (TA) dimensioning is done at the time of network deployment, the need for slices (enterprises) and services support is known at a much later time. Furthermore, the area where a specific service needs to be supported can be relatively small in some use cases (e.g., a pop-up store promoting a new application using augmented or virtual reality) compared to the size of the TA and coverage provided by cells operating in high priority can be spotty.

Figure 1:
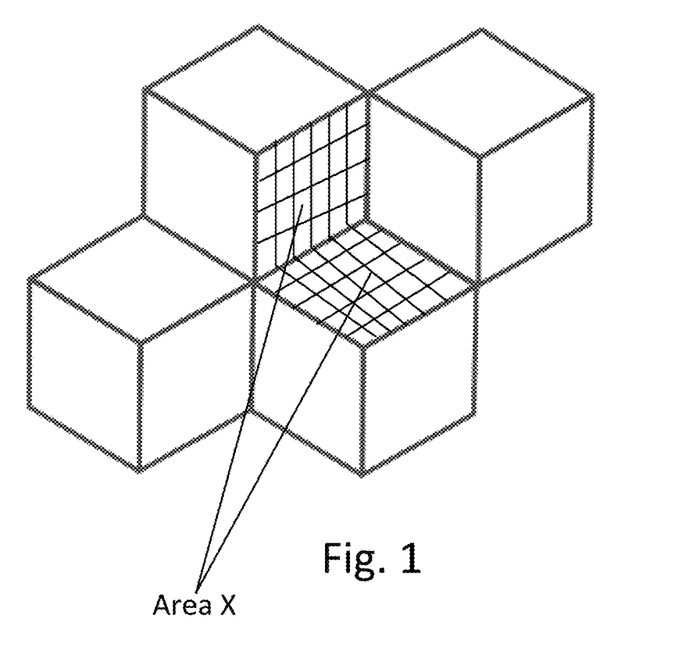
FIG. 1 illustrates an example deployment methods, according to an embodiment.
Figure 2:
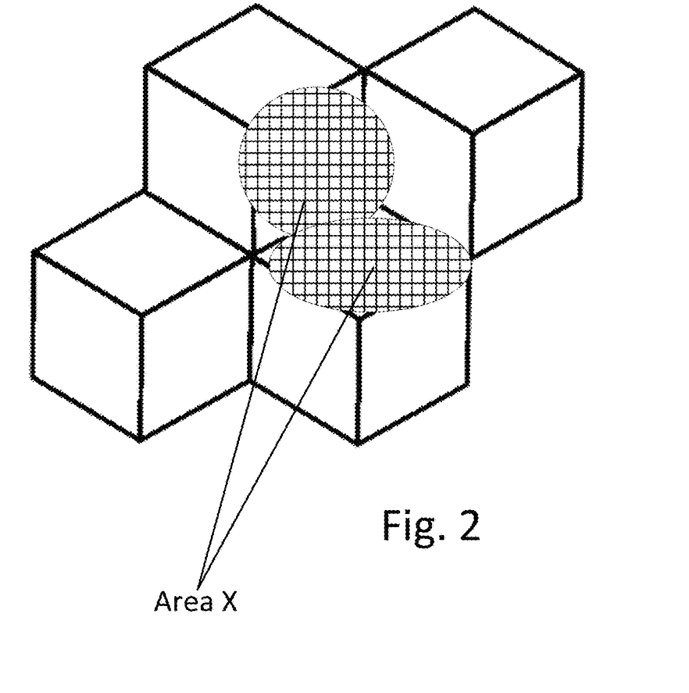
FIG. 2 illustrates another example deployment methods, according to an embodiment.

FIG. 1 and FIG. 2 illustrate examples of two possible deployment methods, according to certain embodiments. In the examples of FIGS. 1 and 2, the area with the cross hatching is referred to as Area X and the areas without cross hatching represent an existing tracking area with TAI K; additionally, an S-NSSAI supported in the existing tracking area may be denoted as S-NSSAI n.

In the first deployment method (Deployment Method 1) depicted in the example of FIG. 1, there is no overlay, i.e., the cells that used to cover Area X support S-NSSAI m and S-NSSAI n. In the second deployment method (Deployment Method 2) depicted in the example of FIG. 2, new cells (possibly with a different frequency band) are additionally deployed in Area X and these new cells support S-NSSAI m and S-NSSAI n.

Figure 3A:
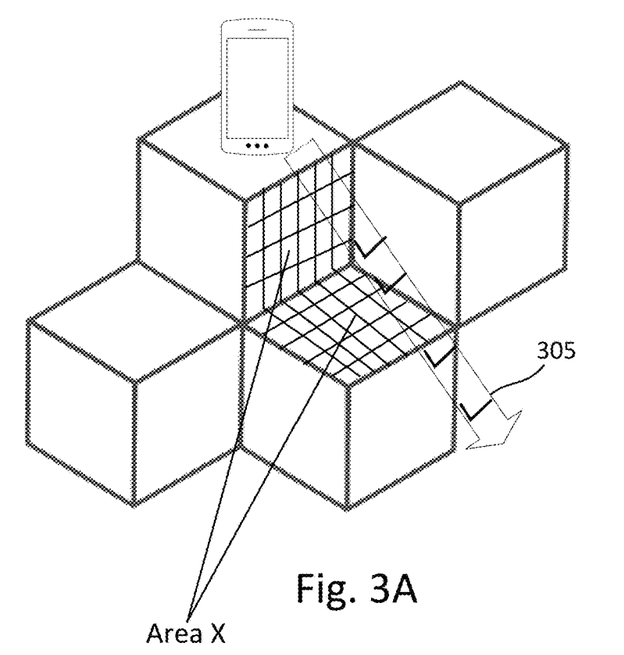
FIG. 3A illustrates an example of a possible trace of a UE and the required registration procedures as the UE moves along the path, according to an embodiment.
Figure 3B:
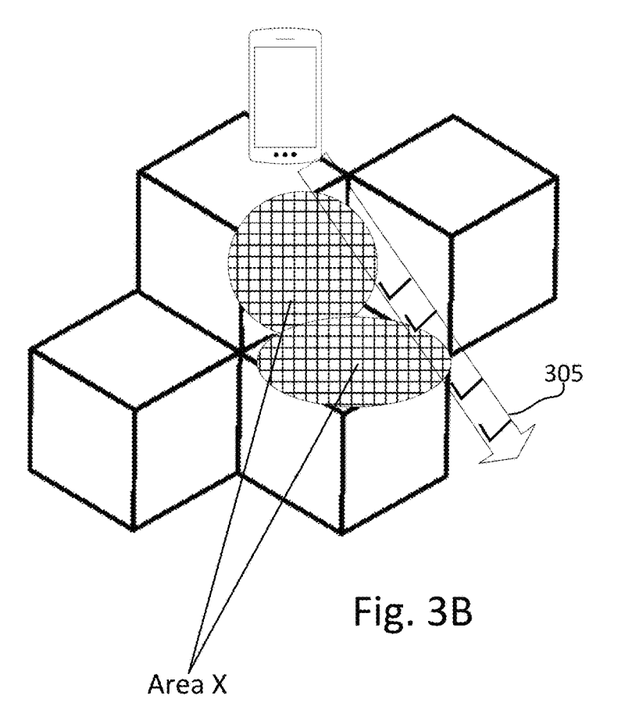
FIG. 3B illustrates another example of a possible trace of a UE and the required registration procedures as the UE moves along the path, according to an embodiment.
Figure 4:
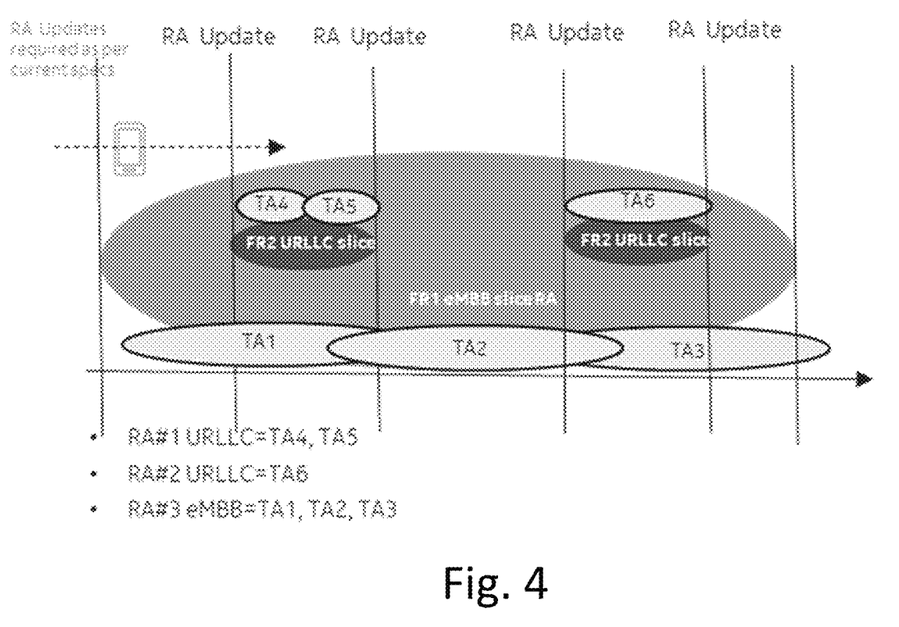
FIG. 4 illustrates an example diagram depicting the slice and service mapped based on frequency band allocation, according to an embodiment.

A registration procedure allows the network to provide (i) information on a single area (i.e., a set of tracking area identities (TAI) or registration area), and (ii) a single list of S-NSSAIs which are uniformly allowed in the area defined by (i). Thus, an allowed S-NSSAI may refer to an S-NSSAI that is valid in a certain registration area. A UE that wants to use S-NSSAI m needs to perform the registration procedure whenever it moves in and out of Area X, which can result in frequent registration procedures. FIGS. 3A and 3B illustrate an example of a possible trace of a UE and the required registration procedures (✓) as the UE moves along the path 305. FIG. 4 illustrates an example diagram depicting the slice and service mapped based on frequency band allocation, with frequent registration area (RA) updates performed.

As will be discussed in more detail below, certain embodiments can provide a system and method for efficient registration for partially supported service areas. As a result, some embodiments may avoid the frequent registration procedures that might otherwise be required.

According to certain embodiments, when an access and mobility management function (AMF) receives a registration request message from a UE (i.e., when the UE performs a registration procedure), the AMF may provide multiple sets containing lists of TAIs and lists of S-NSSAIs, which the UE can use to determine the TAI supporting the appropriate network slice depending on the type of service or slice the UE needs. For example, in an embodiment, the AMF may provide the UE with one or more of the following: (1) registration area that comprises of a list of TAI(s), (2) the allowed NSSAI comprises of a list of S-NSSAI(s) supported in the complete RA, (3) one or more limited registration area(s) that comprises of a list of TAI(s) (subset of RA), and/or (4) partially allowed S-NSSAI(s) that are supported and allowed just in the corresponding limited RA.

In some embodiments, the UE may determine S-NSSAIs allowed for the UE based on the current TAI, e.g., as broadcast by the NG-RAN node, and based on the multiple sets of {list of TAIs, list of S-NSSAIs} received from the AMF. According to an embodiment, the UE is not required to perform a registration procedure when moving between the TAIs included in the registration areas received from the network. In an embodiment, for scenarios such as those depicted in the example of FIG. 2, where UE detects the presence of 2 TAIs with different associated S-NSSAI, the UE may prioritize cell (re)selection based on its preferred S-NSSAI.

According to a first alternative, the AMF may transmit, in a registration accept message to the UE, the following information elements: registration area, allowed NSSAI, limited registration area, and partially allowed NSSAI. Table 1 below depicts how the information elements noted above may be populated according to the example deployment methods introduced above.

TABLE 1

|  | Deployment Method 1 | Deployment Method 2 |
|---|---|---|
| Registration area | TAI J, TAI K | TAI J, TAI K |
| Allowed NSSAI | S-NSSAI n | S-NSSAI n |
| Limited registration area | TAI J | TAI J |
| Partially allowed NSSAI | S-NSSAI m | S-NSSAI m |

In certain embodiments, the UE will consider that partially allowed NSSAI, S-NSSAI m, is supported when the UE is in TAI J. Further, in the above example, when the UE is in a TAI K, the UE considers only the S-NSSAIs in the allowed NSSAI (i.e., S-NSSAI n in this example) as allowed. When the UE needs to be paged, the AMF may select the paging area based on the S-NSSAI associated with the protocol data unit (PDU) session for the UE. In this example, PDU session related to S-NSSAI n→Paging area: TAI J, TAI K; and PDU session related to S-NSSAI m→Paging area: TAI J only. When the UE moves between TAI J and TAI K, the UE does not perform a registration area update.

According to a second alternative, the AMF may transmit, in a registration accept message to the UE, the following information elements: registration area, allowed NSSAI, rejected NSSAI with cause code per S-NSSAI in the rejected NSSAI indicating that the S-NSSAI is not supported uniformly in the registration area, and TAI(s) where each of the S-NSSAIs is supported. It is noted that a rejected NSSAI may refer to a NSSAI that is rejected in the registration area (or for an entire PLMN). As such, a UE might not attempt the rejected NSSAI again in that registration area. Table 2 below depicts how the information elements noted above for this alternative may be populated according to the example deployment methods introduced above. In this example, the UE may consider that S-NSSAI m is supported when the UE is in TAI J. Without loss of generality, what can be applied to rejected NSSAI can be applied to extended rejected NSSAI.

TABLE 2

|  | Deployment Method 1 | Deployment Method 2 |
|---|---|---|
| Registration area | TAI J, TAI K | TAI J, TAI K |
| Allowed NSSAI | S-NSSAI n | S-NSSAI n |
| Rejected NSSAI (with cause code indicating that the S-NSSAI is not supported uniformly in the registration area) | S-NSSAI m | S-NSSAI m |
| TAIs where (each of) the S-NSSAIs in the rejected NSSAI (with cause code indicating that the S-NSSAI is not supported uniformly in the registration area) is supported | TAI J | TAI J |

According to a third alternative, the AMF may transmit, in a registration accept message to the UE, the following information elements: registration area, allowed NSSAI, rejected NSSAI with cause code indicating that the corresponding S-NSSAIs are not supported uniformly in the registration area, TAIs where (each of) the S-NSSAIs in the S-NSSAI list is not supported. Table 3 below depicts how the information elements noted above for this alternative may be populated according to the example deployment methods introduced above. In this example, the UE will consider that S-NSSAI m is supported when the UE is in TAI J. Without loss of generality, what can be applied to rejected NSSAI can be applied to extended rejected NSSAI.

TABLE 3

|  | Deployment Method 1 | Deployment Method 2 |
|---|---|---|
| Registration area | TAI J, TAI K | TAI J, TAI K |
| Allowed NSSAI | S-NSSAI n | S-NSSAI n |
| Rejected NSSAI (with cause code indicating that the S-NSSAI is not supported uniformly in the registration area) | S-NSSAI m | S-NSSAI m |
| TAIs where (each of) the S-NSSAIs in the rejected NSSAI (with cause code indicating that the S-NSSAI is not supported uniformly in the registration area) is not supported | TAI K | TAI K |

According to certain embodiments, an access and mobility management function (AMF) can update the partially allowed NSSAI or rejected NSSAI with cause code indicating that the S-NSSAI is not supported uniformly in the registration area. In addition, the area information can also be updated. The AMF may use the UE configuration update command message to update these parameters. It is noted that, in certain embodiments, the information element(s) and/or the cause code are provided to the UE based on the UE signaling its support for such information in the registration request message.

Figure 5A:
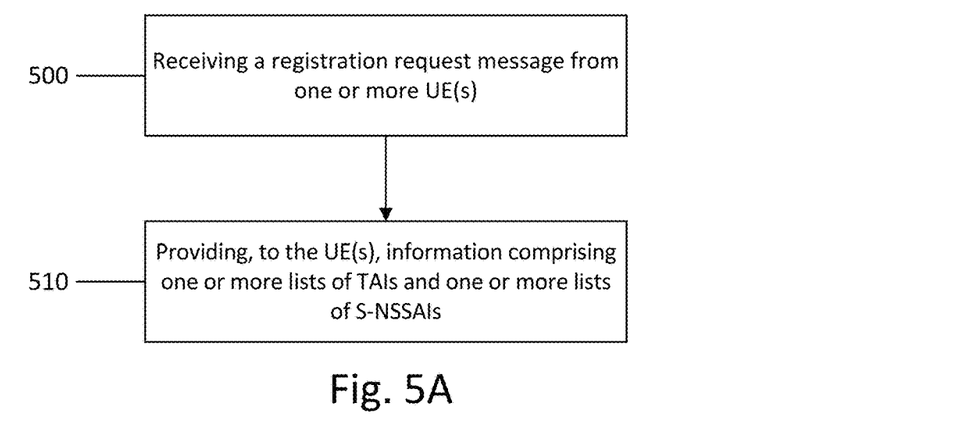
FIG. 5A illustrates an example flow diagram of a method, according to an embodiment.

FIG. 5A illustrates an example flow diagram of a method for beam failure detection and/or beam failure recovery, according to an example embodiment. In certain example embodiments, the flow diagram of FIG. 5A may be performed by a network entity or network node in a communications system, such as LTE or 5G NR. In some example embodiments, the network entity performing the method of FIG. 5A may include or be included in a base station, access node, node B, eNB, gNB, NG-RAN node, transmission-reception points (TRPs), high altitude platform stations (HAPS), relay station or the like. In one embodiment, the network node performing the method of FIG. 5A may include an access management node, such as an AMF or similar radio node.

As illustrated in the example of FIG. 5A, in one embodiment, the method may include, at 500, receiving a registration request message from one or more UE(s) registered to a network within a registration area. In an embodiment, the method may include, at 510, providing, to the UE(s), information comprising one or more lists of TAIs and one or more lists of S-NSSAIs. For example, the providing 510 may include transmitting the information in registration accept message to the UE(s). Additionally or alternatively, the providing 510 may include transmitting the information in a UE configuration update command message to the one or more UE(s). In an embodiment, the one or more S-NSSAIs may indicate S-NSSAIs which are not uniformly supported in the registration area and the one or more lists of TAIs may be associated with the one or more S-NSSAIs. According to an embodiment, each of the one or more S-NSSAIs may be included in a list of rejected S-NSSAIs or in a list of extended rejected S-NSSAIs, and may be associated with a cause value indicating that the one or more S-NSSAIs is not supported uniformly in the registration area and/or is not supported in a current tracking area. In an embodiment, each of the one or more lists of TAIs may identify an area where each of the one or more S-NSSAI is not supported. According to certain embodiments, the providing 510 may include providing the information and/or the cause value to a UE when it signals its support for such information in the registration request message.

According to an embodiment, the one or more S-NSSAIs may be included in an information element identifying S-NSSAIs that are allowed to the UE(s) but are not uniformly supported in the registration area. In an embodiment, each of the one or more lists of TAIs may identify an area where each of the one or more S-NSSAIs is supported.

According to certain embodiments, the information provided at 510 may include at least a registration area comprising a list of the TAIs, allowed NSSAI comprising the list of S-NSSAIs supported in a registration area, one or more limited registration areas comprising a list of TAIs for the limited registration areas, and/or partially allowed S-NSSAIs that are allowed in the corresponding limited registration area. Additionally or alternatively, in some embodiments, the information provided to the UE(s) at 510 may further include a rejected NSSAI with a cause value per S-NSSAI in the rejected NSSAI indicating that the S-NSSAI is not supported uniformly in the registration area, and TAIs where each of the S-NSSAIs is supported. Additionally or alternatively, in certain embodiments, the information provided to the UE(s) at 510 may further include a rejected NSSAI with a cause value indicating that the corresponding S-NSSAIs are not supported uniformly in the registration area and/or is not supported in a current tracking area, and TAIs where the S-NSSAIs in the list of S-NSSAI is not supported.

According to an embodiment, when the UE(s) need to be paged, the method may include selecting a paging area based on the S-NSSAI associated with a PDU session for the UE(s).

Figure 5B:
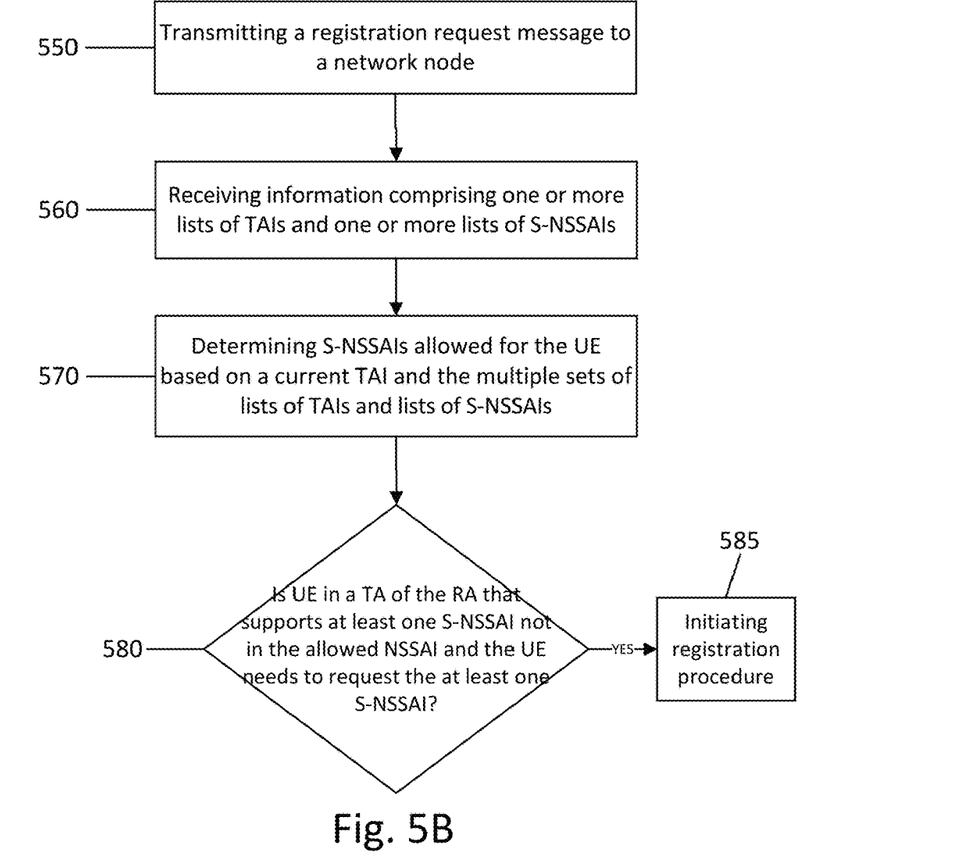
FIG. 5B illustrates an example flow diagram of a method, according to an embodiment.

FIG. 5B illustrates an example flow diagram of a method for beam failure detection and/or beam failure recovery, according to one embodiment. In certain example embodiments, the flow diagram of FIG. 5B may be performed by a network entity or network node in a communications system, such as LTE or 5G NR. In some example embodiments, the network entity performing the method of FIG. 5B may include or be included in UE (e.g., a multi-panel UE), communication node, mobile equipment (ME), mobile station, mobile device, stationary device, IoT device, or other device. According to an embodiment, the UE performing the method of FIG. 5B may be a UE registered to a network within a registration area.

As illustrated in the example of FIG. 5B, in one embodiment, the method may include, at 550, transmitting a registration request message to a network node, such as a gNB or AMF. In an embodiment, the method may include, at 560, receiving information comprising one or more lists of TAIs and one or more lists of S-NSSAIs, which the UE can use to determine a TAI supporting an appropriate network slice depending on a type of service that the UE needs. According to one embodiment, the one or more S-NSSAIs indicate the S-NSSAIs that are not uniformly supported in the registration area and the one or more lists of TAIs are associated with the one or more S-NSSAIs. For example, the receiving 560 may include receiving the information in registration accept message from an AMF. In an embodiment, the receiving 560 may include receiving the information in a UE configuration update command message from the AMF. According to some embodiments, the receiving 560 may include receiving the information and/or the cause value when the UE signals its support for such information in the registration request message.

In an embodiment, the one or more S-NSSAIs may indicate S-NSSAIs which are not uniformly supported in the registration area and the one or more lists of TAIs may be associated with the one or more S-NSSAIs. According to an embodiment, each of the one or more S-NSSAIs may be included in a list of rejected S-NSSAIs or in a list of extended rejected S-NSSAIs, and may be associated with a cause value indicating that the one or more S-NSSAIs is not supported uniformly in the registration area and/or is not supported in a current tracking area. In an embodiment, each of the one or more lists of TAIs may identify an area where each of the one or more S-NSSAI is not supported.

According to an embodiment, the one or more S-NSSAIs may be included in an information element identifying S-NSSAIs that are allowed to the UE(s) but are not uniformly supported in the registration area. In an embodiment, each of the one or more lists of TAIs may identify an area where each of the one or more S-NSSAIs is supported.

According to certain embodiments, the received information may include at least a registration area comprising a list of the TAIs, allowed NSSAI comprising the list of S-NSSAIs supported in a registration area, one or more limited registration areas comprising a list of TAIs for the limited registration areas, and/or partially allowed S-NSSAIs that are allowed in the corresponding limited registration area. Additionally or alternatively, in some embodiments, the received information may further include a rejected NSSAI with a cause value per S-NSSAI in the rejected NSSAI indicating that the S-NSSAI is not supported uniformly in the registration area, and TAIs where each of the S-NSSAIs is supported. Additionally or alternatively, in certain embodiments, the received information may further include a rejected NSSAI with a cause value indicating that the corresponding S-NSSAIs are not supported uniformly in the registration area and/or is not supported in a current tracking area, and TAIs where the S-NSSAIs in the list of S-NSSAI is not supported.

According to some embodiments, the method may include, at 570, determining S-NSSAIs allowed for the UE based on a current TAI broadcast by a radio access network node (e.g., NG-RAN node), and the one or more lists of TAIs and the one or more S-NSSAIs.

According to an embodiment, the method may further include, at 580, detecting or determining whether the UE is in a TA of the registration area that supports at least one S-NSSAI not in the allowed NSSAI and the UE needs to request the at least one S-NSSAI. The method may then include, at 585, initiating, by the UE, performing a registration procedure, e.g., by sending a registration request message, when the UE detects that the UE is currently in an area where at least one of the one or more S-NSSAIs not uniformly supported in the registration area is supported. The registration message may include the one of the one or more S-NSSAIs that is not uniformly supported in the registration area and is supported in the current area.

In an embodiment, the method may include the UE skipping performing a registration procedure when moving between the TAIs included in the registration areas received from the AMF.

According to some embodiments, the method may include the UE considering or determining that at least one of the one or more S-NSSAIs not uniformly supported in the registration area are allowed, if the UE detects that the UE is in an area where the at least one of the one or more S-NSSAIs not uniformly supported in the registration area is supported.

Figure 6A:
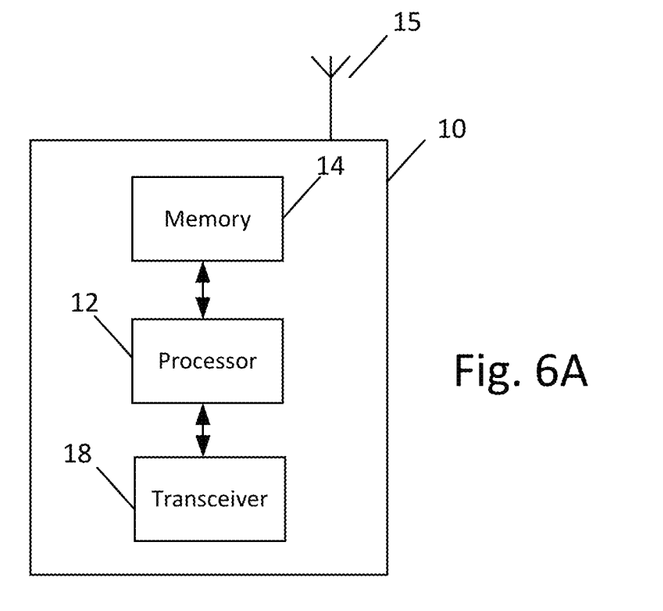
FIG. 6A illustrates an example block diagram of an apparatus, according to an embodiment.

FIG. 6A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB, access management node, AMF, or other similar radio node, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6A.

As illustrated in the example of FIG. 6A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or RAN node, such as a base station, access point, Node B, eNB, gNB, TRP, HAPS, IAB node, WLAN access point, or the like. In one example embodiment, apparatus 10 may be a gNB, AMF, or other radio node. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIG. 5A or 5B, or any other method described herein. In some embodiments, as discussed herein, apparatus 10 may be configured to perform a procedure relating to efficient registration for partially supported service areas, for example.

Figure 6B:
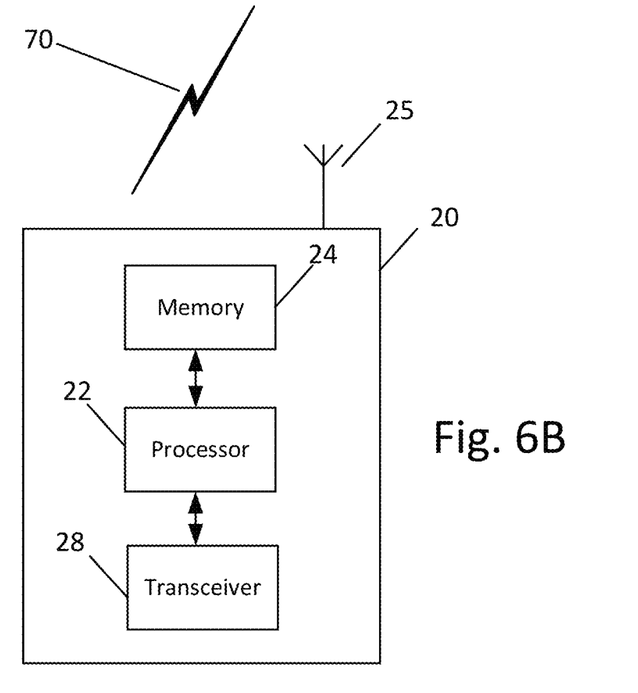
FIG. 6B illustrates an example block diagram of an apparatus, according to an embodiment.

FIG. 6B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6B.

As illustrated in the example of FIG. 6B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to FIG. 5A or 5B, or any other method described herein. For example, in an embodiment, apparatus 20 may be controlled to perform a process relating to efficient registration for partially supported service areas, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, displays, and/or computer program code for causing the performance of any of the operations described herein.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments can provide methods and/or apparatuses for efficient registration for partially supported service areas. As a result of certain embodiments, a UE is made aware of available network slices without the need to perform registration update procedures and can request to establish PDU sessions or initiate scheduling request (SR) for a certain slice. Further, example embodiments allow for reduced control plane (C-plane) traffic thereby reducing the probability of collisions of procedures in the gNB/AMF, e.g., collision of RU and paging which could result in lost paging messages. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:
   receiving, at an access and mobility function of a network, a registration request from a user equipment within a registration area including a plurality of tracking areas, the registration request comprising a plurality of single network slice selection assistance information (S-NSSAIs);
   determining, at the access and mobility function of the network, for at least one respective S-NSSAI of the plurality of S-NSSAIs, whether the respective S-NSSAI is supported in a current tracking area of the user equipment, each of the plurality of tracking areas being identified by a tracking area identifier (TAI), wherein when the respective S-NSSAI is supported in the current tracking area, the S-NSSAI is accepted, and when the S-NSSAI is not supported in the current tracking area, the S-NSSAI is rejected; and
   transmitting, at the access and mobility function of the network, to the user equipment, a response to the registration request, the response comprising which of the at least one S-NSSAI of the plurality of S-NSSAIs is accepted or rejected in the current tracking area, and a list comprising one or more TAIs of the plurality of TAIs in which the accepted or rejected S-NSSAI is supported or not supported.

2. The method of claim 1, wherein the list comprises one or more TAIs for tracking areas of the plurality of tracking areas in which the respective rejected S-NSSAI is supported, and wherein the respective rejected S-NSSAI is partially allowed.

3. The method of claim 1, wherein the list comprises one or more TAIs for tracking areas of the plurality of tracking areas in which the respective rejected S-NSSAI is not supported, which includes the TAI of the current tracking area.

4. The method of claim 1, further comprising:
   after transmitting the response to the registration request to the user equipment, receiving a second registration request from the user equipment in a new tracking area of the plurality of tracking areas, the second registration request comprising at least one S-NSSAI of the plurality of S-NSSAIs indicated as supported in the new tracking area and accepted; and
   registering the user equipment to the at least one S-NSSAI of the plurality of S-NSSAIs indicated as supported and accepted, and transmitting a response to the second registration request to the user equipment, the response to the second registration request comprising which of the plurality of S-NSSAIs is accepted and rejected.

5. A method, comprising:
   transmitting, by a user equipment to a network, a registration request to register to the network, the user equipment being within a registration area including a plurality of tracking areas, the registration request comprising a plurality of single network slice selection assistance information (S-NSSAIs);
   receiving, by the user equipment from the network, a response to the registration request, the response comprising which of the plurality of S-NSSAIs is supported or not supported in a current tracking area of the user equipment, and a list comprising one or more tracking area identifiers (TAIs) of a plurality of TAIs in which the accepted or rejected S-NSSAI is supported or not supported, the plurality of TAIs respectively corresponding to the plurality of tracking areas, wherein when the S-NSSAI is supported in the TAI of the current tracking area, the S-NSSAI is accepted, and when the S-NS SAI is not supported in the TAI of the current tracking area, the S-NSSAI is rejected; and
   determining, by the user equipment, at least one S-NSSAI of the plurality of S-NSSAIs included in the list of S-NSSAIs that is supported and accepted, and initiating a registration procedure for the at least one S-NSSAI that is supported and accepted.

6. The method of claim 5, wherein the list comprises one or more TAIs for tracking areas of the plurality of tracking areas in which the respective rejected S-NSSAI is supported and wherein the respective rejected S-NSSAI is partially allowed.

7. The method of claim 5, wherein the list comprises one or more TAIs for tracking areas of the plurality of tracking areas in which the respective rejected S-NSSAI is not supported, which includes the TAI of the current tracking area.

8. The method of claim 5, wherein the registration request is transmitted to an access and mobility management function (AMF) of the network.

9. The method of claim 5, wherein the registration procedure comprises:
   transmitting, to the network, a second registration request including at least one S-NSSAI of the plurality of S-NSSAIs indicated as supported and accepted; and
   receiving, by the user equipment from the network, a response to the second registration request confirming registration of the user equipment to the at least one S-NSSAI of the plurality of S-NSSAIs indicated as supported and accepted.

10. An apparatus, comprising:
    at least one processor; and
    at least one memory comprising computer program code, the at least one memory and the computer program code being configured, with the at least one processor, to cause the apparatus at least to:
    receive, at an access and mobility function, a registration request from a user equipment within a registration area including a plurality of tracking areas, the registration request comprising a plurality of single network slice selection assistance information (S-NSSAIs);
    determine, at the access and mobility function, for at least one respective S-NSSAI of the plurality of S-NSSAIs, whether the respective S-NSSAI is supported in a current tracking area of the user equipment, each of the plurality of tracking areas being identified by a tracking area identifier (TAI), wherein when the respective S-NSSAI is supported in the current tracking area, the S-NSSAI is accepted, and when the S-NSSAI is not supported in the current tracking area, the S-NSSAI is rejected; and
    transmit, at the access and mobility function, to the user equipment, a response to the registration request, the response comprising which of the at least one S-NSSAI of the plurality of S-NSSAIs is accepted or rejected in the current tracking area, and a list comprising one or more TAIs of the plurality of TAIs in which the accepted or rejected S-NSSAI is supported or not supported.

11. The apparatus of claim 10, wherein the list comprises one or more TAIs for tracking areas of the plurality of tracking areas in which the respective rejected S-NSSAI is supported, and wherein the respective rejected S-NSSAI is partially allowed.

12. The apparatus of claim 10, wherein the list comprises one or more TAIs for tracking areas of the plurality of tracking areas in which the respective rejected S-NSSAI is not supported, which includes the TAI of the current tracking area.

13. The apparatus of claim 10, wherein the at least one memory and the computer program code are configured, with the at least one processor, to cause the apparatus at least to:
after transmitting the response to the registration request to the user equipment, receive a second registration request from the user equipment in a new tracking area of the plurality of tracking areas, the second registration request comprising at least one S-NSSAI of the plurality of S-NSSAIs indicated as supported in the new tracking area and accepted;
register the user equipment to the at least one S-NSSAI of the plurality of S-NSSAIs indicated as supported and accepted; and
transmit a response to the second registration request to the at least one user equipment, the response to the second registration request comprising which of the plurality of S-NSSAIs is accepted and rejected.

* * * * *